May 5, 1964

I. B. COOPER, JR 3,131,559

FLOW MEASURING SYSTEM

Filed Dec. 30, 1957

INVENTOR.
IRVING B. COOPER

BY
*Grover Q. Frater*

ATTORNEY

May 5, 1964     I. B. COOPER, JR     3,131,559

FLOW MEASURING SYSTEM

Filed Dec. 30, 1957     2 Sheets-Sheet 2

INVENTOR.
IRVING B. COOPER
BY
Grover A. Frater
ATTORNEY

United States Patent Office 3,131,559
Patented May 5, 1964

3,131,559
FLOW MEASURING SYSTEM
Irving B. Cooper, Jr., Davenport, Iowa, assignor to The Bendix Corporation, a corporation of Delaware
Filed Dec. 30, 1957, Ser. No. 705,986
3 Claims. (Cl. 73—194)

This invention relates to improvements in measuring instruments and it relates particularly to improved instruments for measuring the mass rate of fluid flow.

Recently several instruments have been made available for the direct measurement of mass rate of fluid flow. The superiority of these instruments, called "true mass flowmeters," over the older density compensated volumetric flow rate meters was soon recognized for certain applications. This superiority was especially apparent in connection with in-flight measurement of aircraft fuel consumption rate. However, in all of these new instruments accuracy is directly dependent upon the maintenance of constant speed in an included electric motor drive. This limitation precludes direct connection of these meters to the electrical generators of the aircraft, whose output voltage and frequency cannot be maintained sufficiently constant to provide the desired flowmeter accuracy. Instead, separate, complex, expensive, and space consuming constant frequency electrical power sources must be provided. An object of this invention is to provide a true mass flowmeter whose accuracy is independent of frequency and normal voltage variation, and more specifically, which can be powered by ordinary aircraft electrical generating apparatus.

In this connection it is an object of the invention to provide a true mass flowmeter including a rotating instrumentality for altering fluid momentum, in which said instrumentality is not required to rotate at any particular speed and not even at a constant speed.

Because of the requirement for rotation of certain of their elements at a given constant speed, and for other reasons, prior true mass flowmeters require mechanical or electrical drive connections to be made into a space containing the fluid. Another object of the invention is to provide a meter in which no such connections are required.

These objects are realized by altering the momentum of the fluid flow and providing means for sensing the force required to produce the change in momentum. The force is sensed in a way that permits elimination of the velocity component of the momentum change so that only mass rate of flow is measured.

The fluid momentum is most conveniently altered by interposing a rotatable element in the fluid path which will act on the fluid to change its velocity. The force required to effect the change is proportional to the degree of velocity change and the mass of the fluid whose velocity is changed. When the fluid flows past the rotating element continuously, new masses of fluid are continuously presented to the rotating element. Accordingly, a continual force is required to change the momentum of the flowing fluid and the continual force exerted by the rotatable element is proportional to the degree of velocity change and the mass rate of fluid flow.

In the preferred form of the invention the force required to change the fluid velocity is applied as a torque to a rotatable element which is arranged so that it will be rotationally displaced, relative to the reference position, through an angle proportional to the magnitude of the force. Means are provided for measuring the time required for rotation through this angle at a rotational speed corresponding to the velocity change of the fluid. This time is then proportional to the magnitude of the displacement angle divided by said velocity change. Since the angle is proportional to the change in momentum, or velocity change times mass rate of flow, the measured time is proportional to the mass rate of fluid flow.

One important advantage in the provision of such time measuring means is that they can be embodied in a variety of structural arrangements. Thus where the instrument includes first rotatable means for altering the velocity of the fluid flow, second means for supplying the force required to effect the velocity change, and third means for displacing the rotatable means through an angle proportional to the change in fluid velocity, the means for measuring the time interval required for rotation through said angle of displacement at a velocity corresponding to said change in fluid velocity can comprise reference points associated with each of the first, second, and third means any one of which points may be rotated at said velocity past the other two, together with means for determining the time required for said one point to travel between the other two. Permitting this wide choice of time measuring arrangements is another object of the invention.

A further object is to provide a flowmetering system enabling the use of relatively simple structures in the flowmeter whereby to reduce its manufacturing cost, the difficulties of manufacture and the possibility of malfunctioning.

Rather than apply the force of a prime mover to rotate an impeller which imparts an angular acceleration to a fluid and then measures the force required to overcome the resultant change in momentum by passing the accelerated fluid through an element rotatable by said momentum through an angle against a spring force until said momentum is balanced by said force and then measuring the fluid flow rate by measuring the time required to pass through said angle at the angular velocity imparted to the fluid or to employ other apparatus in which my invention may be embodied, I now prefer, since it is especially advantageous, to embody my invention in the form selected for illustration in the accompanying drawing and described in the following specification in which other objects and advantages of the invention will be apparent. It is to be understood that various modifications of the embodiment illustrated and other embodiments are possible without departing from the spirit of the invention or the scope of the appended claims.

Figure 1:
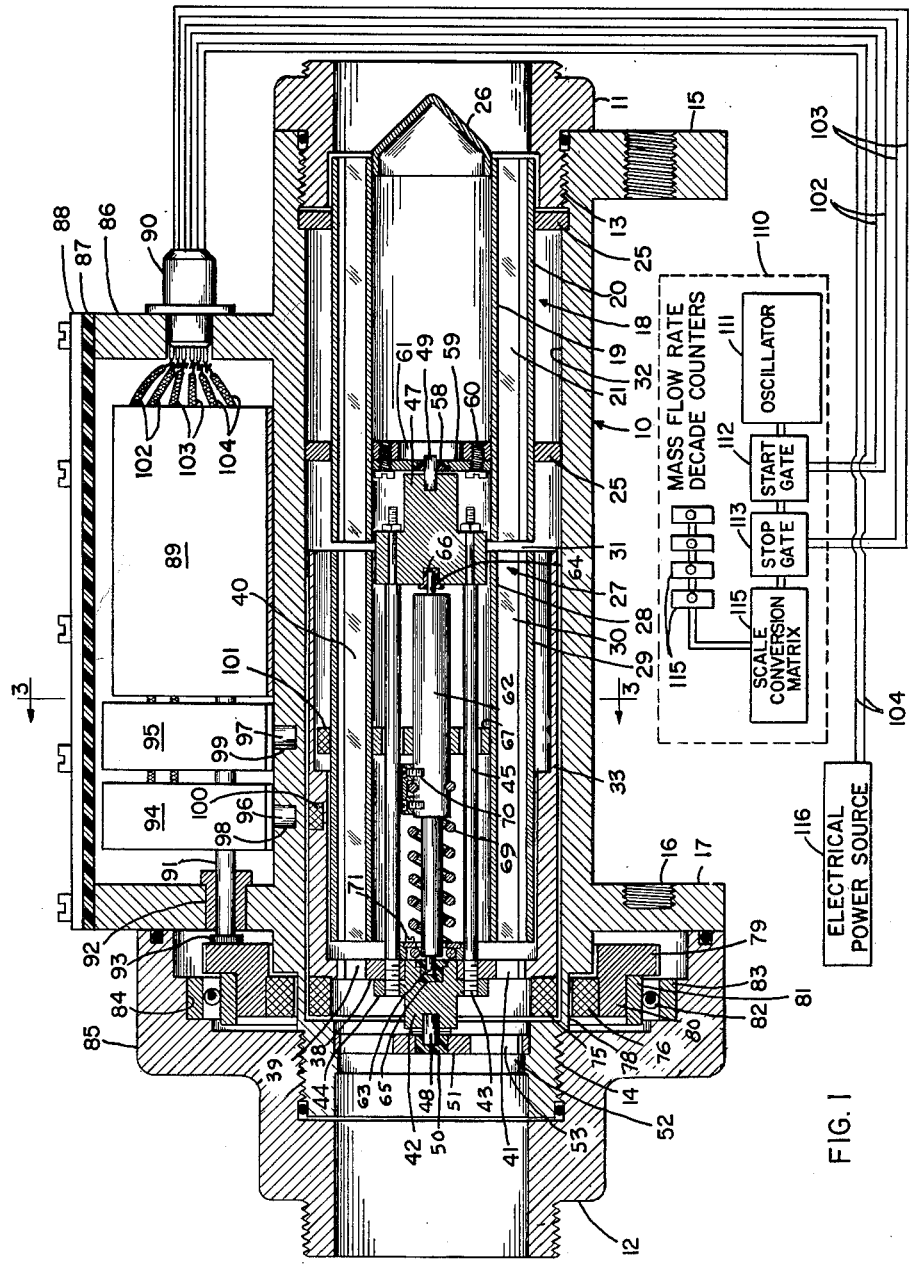
FIG. 1 is a cross-sectional view of a fuel flowmeter connected to an electrical flow indicating system shown schematically embodying the invention.

Referring to the drawing, the flowmeter there shown is arranged for insertion in a fuel flow line. Motive power means drives a rotary element to change the angular velocity of the flowing fluid. Means are provided for coupling the rotary element to the motive power means so that it rotates at the speed of its driver but will be angularly displaced through an angle proportional to the force exerted by the rotating element on the fluid. The rate of fuel flow is then determined by measuring at frequent intervals the time required to traverse that angle at a speed corresponding to the change in angular speed of the fluid. To simplify determination of this speed, means are provided for insuring that the fluid has no angular velocity as it arrives at the point of action of the rotary element. Then the speed of the rotary element and its driving element is equal to the change in rotational velocity of the fluid.

The flowmeter housing comprises a cylindrical casing 10 to the ends of which an inlet fitting 11 and an outlet fitting 12 are attached by suitable means such as threads 13 and 14. Means for mounting the meter housing are provided in a lug 15, extending laterally from the inlet end of casing 10, and studs 16 connected at spaced points around an annular flange 17 which is joined to the casing 10 and encircles it near its outlet end.

The means to insure that the fluid has no angular velocity when it arrives at the rotating element may comprise straightening vanes and advantageously comprises, as shown, a double-walled cylinder 18 comprising an inner wall 19 and an outer wall 20 held concentrically spaced by a plurality of thin radially disposed straightening vanes 21. The vanes extend the length of walls 19 and 20 and are equally spaced around the outer periphery of the inner wall 19 and the inner periphery of outer wall 20 with which the vanes 21 are integrally formed.

Figure 2:
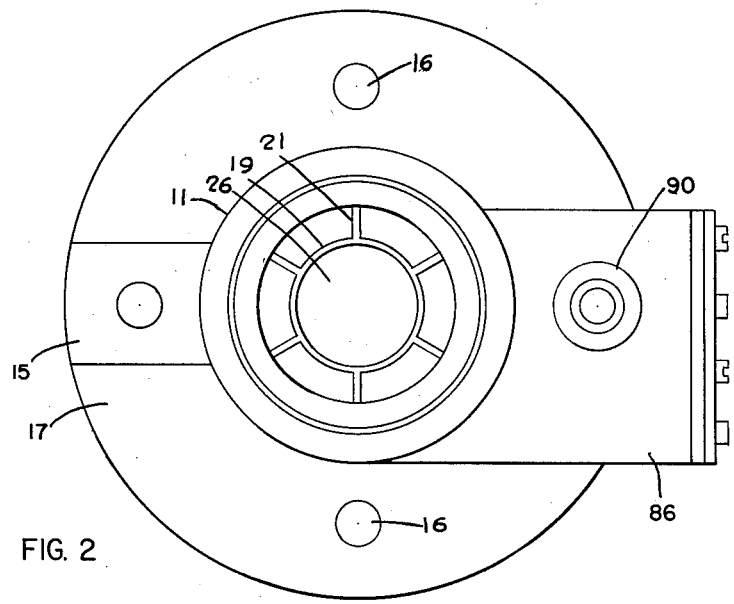
FIG. 2 is a view in elevation of the inlet end of the flowmeter.

The diameter of the cylinder 18 is chosen to match the diameter of the rotating element to be described later. Since this is less than the inner diameter of casing 10, annular spacing rings 25 are interposed between cylinder 18 and the inner wall casing 10 to hold the cylinder concentrically within the casing at its inlet end. A plug 26 pressed, as shown, or secured by any other convenient means to the cylinder 18, closes the inner opening of the cylinder. Advantageously it is streamlined to direct fluid into the parallel flow paths between vanes 21 with a minimum of turbulence. The arrangement of the vanes 21 and plug 26 is shown in an end view looking through inlet fitting 11 in FIG. 2.

The means for imparting rotary motion to the fluid advantageously comprises an impeller 27 having inner and outer cylindrical walls 28 and 29. Walls 28 and 29 advantageously have diameters substantially equal to the diameters of walls 19 and 20, respectively, of cylinder 18 and are axially aligned therewith. The impeller blades 30 may, as shown, be integrally formed with the walls 28 and 29 and extend over the length of the impeller, they are advantageously thin and straight and radially disposed as shown.

The impeller is positioned downstream from the flow straightening cylinder 18 so that a short space 31 is provided between them. The spacing is not critical and is provided, as will be obvious to those skilled in the art, to prevent excessive fluid friction as the fluid passes from the cylinder 18 to the impeller 27. Likewise, fluid entering the space between outer impeller wall 29 and the inner wall 32 of casing 10 since it would contact both the stationary wall 32 and the moving wall 29 would exert a viscous drag on the impeller. To prevent this, a fluid decoupling cylinder 33 driven by the motive power means at the speed of the impeller is disposed in this space. The viscous drag is then applied not to the impeller 27 but to the decoupling cylinder 33. The impeller is driven by the motive means at the speed of the motive means but means are provided by which the impeller is angularly displaced from its driving element in accordance with the resistance of the fluid to change in its angular velocity. So that the resistance offered by the fluid is a measure only of the mass rate of fluid flow and the change in its angular velocity, it is desirable that viscous drag on the impeller be minimized. Viscous drag on the decoupling cylinder 33 is simply overcome by the motive power means and does not effect instrument accuracy.

The impeller driving element advantageously has the form shown in the drawing wherein it comprises a disk 38 disposed downstream from impeller 27, integrally formed at its margins with the downstream end of decoupling cylinder 33, has a series of spaced openings 39 corresponding with and located opposite the passages 40 in the impeller formed between walls 28 and 29 by blades 30 and separated by spokes 41 whereby fluid may flow out of the impeller and through openings 39 toward outlet fitting 12.

A flanged hub 42 is held in a central opening of disk 38 by the threaded ends 43 of diametrically positioned parallel rods 45 which extend through the hub flange 44.

The rods extend through the impeller 27 in the opening 46 inside of inner impeller wall 28 and terminate in ends which are connected, as by nuts, as shown, to a cylindrical supporting hub 47.

This drive assembly including decoupling cylinder 33, disk 38, hub 42, rods 45 and hub 47 is supported axially within casing 10 by axial pins 48 and 49 press fitted into and extending from hubs 42 and 47 respectively. Pin 48 is rotatably carried in a bearing such as bearing 50 formed of low friction material such as the nylon shown, and bearing 50 is carried centrally by a supporting disk 51 press fitted within casing 10 against an inner annular stop flange 52 which is provided with openings 53 by which fluid leaving openings 39 of disk 38 may flow readily toward outlet fitting 12.

Pin 49 is rotatably mounted in a bearing 58 advantageously formed of low friction material such as the nylon shown. Bearing 58 is carried by a supporting disk 59 suitably secured to the flow straightening cylinder 18, and may be secured as shown by bolts 60 to an annular flange 61 formed integrally with cylinder wall 19.

The impeller 27 is carried by the above described drive assembly so that it rotates with said assembly and can be rotationally displaced with respect thereto. In the form selected for illustration, the means for interconnecting the impeller and drive assembly comprises an axle 62 terminating at its ends in pins 63 and 64 which are rotatably carried respectively by low friction bushings 65 and 66, preferably formed of nylon as shown, so that the axis of the axle lies on the axis of rotation of the drive assembly. The bushings 65 and 66 are carried by hubs 42 and 47 respectively. An inwardly extending annular flange 67 secured by any convenient means to the inner wall 28 of impeller 27, and here shown to be integrally formed with said wall, is secured, such as by pressed fitting as shown, to axle 62.

Figure 3:
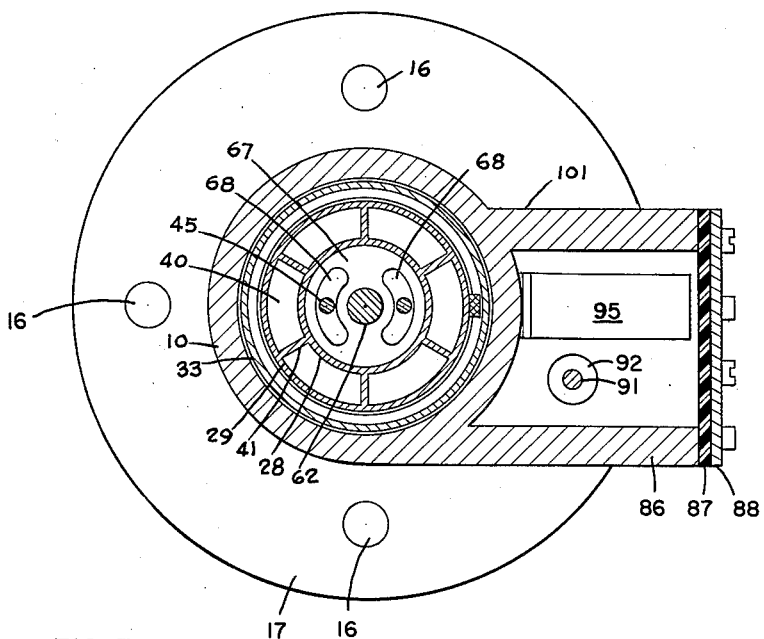
FIG. 3 is a sectional view of the flowmeter taken on line 3—3 of FIG. 1.

The flange 67 is provided with arcuate, elongated, opposed slots 68 through which rods 45 extend and whereby rotation of the impeller 27 relative to the drive assembly is permitted. Slots 68 are shown best in FIG. 3. The impeller 27 is driven by the drive assembly by means which provides such rotational displacement as a known function, and advantageously a linear function, of the force exerted by the impeller on the fluid. While this means could comprise other well known devices such as magnetic couplers, it advantageously comprises a linear spring such as the coil spring 69. Coiled around axle 62, spring 69 is fixed by clamping means 70 to axle 62 at one end and is fixed by clamping means 71 to hub 42 at its other end.

Advantageously, the motive means for the drive assembly and impeller is magnetic in character because by employing a magnetic drive the need for making mechanical or electrical connections through the casing is obviated. While any means for generating a rotating magnetic drive field may be employed, permanent magnets are advantageously used. The magnetic drive selected for illustration comprises a pair of concentrically arranged ring magnets 75 and 76 having a like number of poles spaced around their respective circumferences. The inner or rotor magnet 75 is press fitted into an annular cut-out at the junction of the decoupling cylinder 33 and drive disk 38 so that it is fixed relative to the disk. It has an outer diameter to just clear the inner wall 32 of casing 10. The outer diameter of the casing is smaller at this point 78 so that the casing wall is relatively thin. The outer ring magnet surrounds and just clears the outer wall of casing 10 at this point.

Means are provided for rotating outer magnet 76. Advantageously this means comprises a ring gear 79 having a cylindrical flange 80 into which the outer ring magnet 76 is pressed. The flange 80 is pressed into the inner race 81 of a ball bearing 82 whose outer race 83 is pressed into an annular cutout 84 of the enlarged end 85 of outlet fitting 12. The ball bearing 82 holds the ring gear 79 which in turn holds the outer ring magnet 76 concentric with the axis of the drive assembly and impeller. The face of the outlet fitting 12 is sealed against the casing flange 17 to seal the space in which the bearing, gear and magnet are disposed.

Walls 86, projecting from casing 10 and formed integrally therewith, cooperate with flange 17, a sealing member 87 and cover 88 to form a housing for a drive motor 89. Electrical connections to the motor are made through a connector plug 90. The motor is mounted within the housing by suitable means, not shown, and its output shaft 91 extends through a low friction bushing 92 into the end of outlet fitting 12 adjacent ring gear 79. A spur gear 93 pressed onto the end of motor shaft 91, meshes with ring gear 79 whereby the outer magnet 76 is rotated when the motor is energized.

Means are provided in the invention for measuring the time interval required to traverse the angle through which the impeller is displaced relative to one of the elements which drives the impeller, the angle to be traversed at a speed having a known relation to the speed of the impeller whereby the interval will be proportional to the mass rate of fluid flow. Since in the flowmeter selected for illustration, both the impeller and drive elements revolve relative to the casing, the time interval is advantageously measured as the time between passage of reference points on the impeller and drive or prime mover elements past a fixed point on the casing or, what is equivalent thereto, the passage of the reference points between respectively associated fixed points whose angular separation is known. Moreover, the reference points are advantageously marked by magnets and the fixed points represent the points of location of magnetism sensitive pickups which provide a signal as the associated reference magnet passes.

In the drawing the pickups 94 and 95 are disposed in the housing formed by wall 86. Each comprises a magnetic core 96 and 97, respectively, and a coil wound around the core so that when the magnetic field of the core is altered by passage nearby of another magnet a voltage will be induced in the winding of that core. Casing 10, decoupling cylinder 33 and impeller 27 are formed of non-magnetic material to prevent interference with this action.

The pickups are held, by means not shown, with their respective core ends fixed in corresponding recesses 98 and 99 in the wall of casing 10. One reference magnet 100 is imbedded in the wall of decoupling cylinder 33 so that it passes core 96 as cylinder 33 rotates. Beyond this point, toward the open end of cylinder 33, the inner diameter of cylinder 33 is increased providing clearance for a second reference magnet 101 which is securely fastened by suitable means, such as by an adhesive as shown, to the outer wall 29 of impeller 27 so that it passes core 97 of pickup 95 as the impeller 27 rotates.

The coils of pickups 94 and 95 are connected to the pairs of leads 102 and 103, respectively, which, together with power leads 104 of motor 89, are soldered to the lugs of connector plug 90. During each revolution of the drive mechanism and impeller, magnets 100 and 101 respectively will pass pickups 94 and 95 and two electrical voltage pulsations will be induced across leads pairs 102 and 103. The time separation of the pulses will be a measure of the angular separation of magnets 100 and 101 divided by the velocity at which the magnets are rotating. Thus the time interval between pulses is proportional of the mass rate of fuel flow. The means to measure the time interval between the pulses may be any of the well known devices for measuring time intervals. Applicant now prefers to employ a counter calibrated in terms of mass rate of fuel flow. Such a counter 110 is shown schematically. It comprises a fixed frequency oscillator, such a crystal oscillator 111, and a start gate 112 and stop gate 113 interposed between the oscillator 111 and a scale converter 114 which may be of the matrix type. The scale converter output is applied to the decade counters 115. Upon receiving an electrical voltage pulse from pickup 94, start gate 112 permits signals from oscillator 111 to pass to scale converter 114. The signal is interrupted when a voltage pulse from pickup 95 is received at stop gate 113.

Thus oscillator signals are transmitted to the scale converter 114 for the period between pulses from pickups 94 and 95. The scale converter counts the number of oscillations of the oscillator during this interval and effectively changes the number of oscillations by a scale factor equal to the constant of proportionality between time and the selected units, usually pounds-per-hour, of mass rate of fuel flow. These pulses or oscillations are then counted in decade counters 115 wherein the count indicated represents quantities by weight per unit time of fluid flow.

In operation of the system, when energized by electrical power source 116 through leads 104, motor 89 will operate to rotate the outer ring magnet 76 in the clockwise direction as viewed from the outlet end of the flowmeter. Magnetically coupled to the outer ring magnet through the non-magnetic casing 10 at point 78, the inner ring magnet 75 will follow magnet 76 in its clockwise rotation and will rotate at the same speed. Magnet 75 is fixed to the impeller drive assembly comprising decoupling cylinder 33, drive disk 38, rods 45, and hubs 42 and 47 and this assembly will be rotated in accordance with the rotation of magnet 76. Because of its connection to this drive assembly through spring 69, impeller 27 will be rotated at the same speed.

In the absence of fluid flow through the meter there is no force to oppose rotation of the impeller after its inertia has been overcome. Accordingly, there will be no relative angular displacement between the impeller and its drive assembly and magnets 100 and 101 will rotate to pass electrical pickups 94 and 95 respectively, at the same instant. The electrical output pulses from the pickups are applied through leads 102 and 103 to start gate 112 and stop gate 113 simultaneously so that no signal will be transmitted through the gates from oscillator 111 to the decade counters 115. Thus the counters will indicate zero flow rate.

If now fluid is permitted to flow into the flow meter through inlet fitting 11, that fluid will be directed by hub 26 into the flow straightening cylinder 18. In passing through the cylinder between vanes 21 any rotational velocity of the fluid will be reduced to zero. When it emerges from cylinder 18 and passes through the space 31 into the rotating impeller 27, the impeller vanes 30 will spin the fluid to give it a rotational velocity equal to the impeller velocity. If the flow is continuous, then the opposition that it presents to a change in its momentum is continuous and the impeller will experience a continual force tending to retard its rotation. This retarding force will cause the impeller to lag its drive assembly and to wind spring 69 more tightly until the force stored in the spring is equal to the retarding force experienced by the impeller. Since the force stored in the spring is a linear function of the degree in which it is thus wound, the angular displacement of the impeller relative to its drive assembly will be a linear function of the retarding force of the fluid. This force being equal to mass flow rate times the change in fluid velocity it will, for a given flow rate, vary directly with velocity. Thus the angular displacement of magnets 100 and 101 carried by the drive assembly and the impeller, respectively, will vary directly with the change in fluid velocity but since both of these magnets rotate at a speed which corresponds to the change in fluid velocity whatever that change might be, the time interval between the instants at which the magnets will pass a fixed point on the stationary casing of the meter will be exactly the same if flow rate is unchanged. Accordingly, the time interval between the passage of magnets 100 and 101 past the point at which pickups 94 and 95 are located will be a measure only of the mass rate of fluid flow. Magnet 100 will pass pickup 94 and an electrical impulse transmitted through leads 102 will open start gate 112 permitting signals from oscillator 111 to be transmitted to the scale converter 114 and the decade counters 115 until at some later time magnet 101 passes pickup 95 and an electrical impulse is transmitted through leads 103 to operate the stop gate 113. Having counted the impulses received from oscillator 111 during this interval, the counters 115 will indicate the mass flow rate.

If fluid flow ceases, the fluid in the impeller will have been accelerated to the speed of the impeller and will present no opposition to impeller location. Therefore spring 69 will unwind until magnets 100 and 101 are again in alignment so that the signals from pickups 94 and 95 will be applied to the start and stop gates simultaneously and the counters will again register zero flow rate.

I claim:
1. A flowmeter comprising,
 (a) a flowpath for fluid flow,
 (b) rotatable momentum imparting means for imparting momentum to fluid flowing in said flowpath,
 (c) power responsive drive means for connection to a source of power independent of fluid flow,
 (d) means for rotating said momentum imparting means at the rotational speed of said drive means but angularly displaced therefrom at an angle proportional to the momentum imparted to said fluid by said momentum imparting means including means for completing an elastic connection from said drive means to said momentum imparting means,
 (e) means for measuring the mass rate of fluid flow through said flowpath in time units representing units of mass flow rate including means for detecting the time interval required for said momentum imparting means to traverse the angle by which it is so angularly displaced.

2. A fluid flowmeter comprising,
 (a) a housing defining a flowpath of circular cross sectional area,
 (b) means comprising a rotatable impeller in said flowpath for imparting momentum to said fluid at right angles to its momentum in the direction through said flowpath,
 (c) motive means for producing a rotational torque independent of fluid flow including a rotatable driver,
 (d) means comprising a spring interconnecting said driver and said impeller for rotating said impeller at the speed of said driver but lagging said driver by an angular displacement proportional to the momentum imparted thereby to the fluid, and
 (e) means for measuring the mass rate of fluid flow through said flowpath in time units representing units of mass flow rate including means for detecting the time interval required for said impeller to traverse the angle of said angular displacement.

3. The invention defined in claim 2 including means comprising vanes disposed in said flowpath for insuring that fluid flowing to said impeller has no component of momentum normal to the direction of flow through said flowpath.

References Cited in the file of this patent

UNITED STATES PATENTS

| 2,472,609 | Moore | June 7, 1949 |
| 2,831,162 | Gross | Apr. 15, 1958 |
| 2,832,218 | White | Apr. 29, 1958 |
| 2,943,487 | Potter | July 5, 1960 |
| 2,975,635 | Kindler | Mar. 21, 1961 |

FOREIGN PATENTS

| 600,980 | Great Britain | Apr. 23, 1948 |
| 740,037 | Great Britain | Nov. 9, 1955 |
| 925,622 | Germany | Mar. 24, 1955 |